May 10, 1966   F. J. LUKETA   3,250,035
TRAWL BOBBIN AND CHAFING APRON ASSEMBLY
Filed Oct. 29, 1963   7 Sheets-Sheet 1
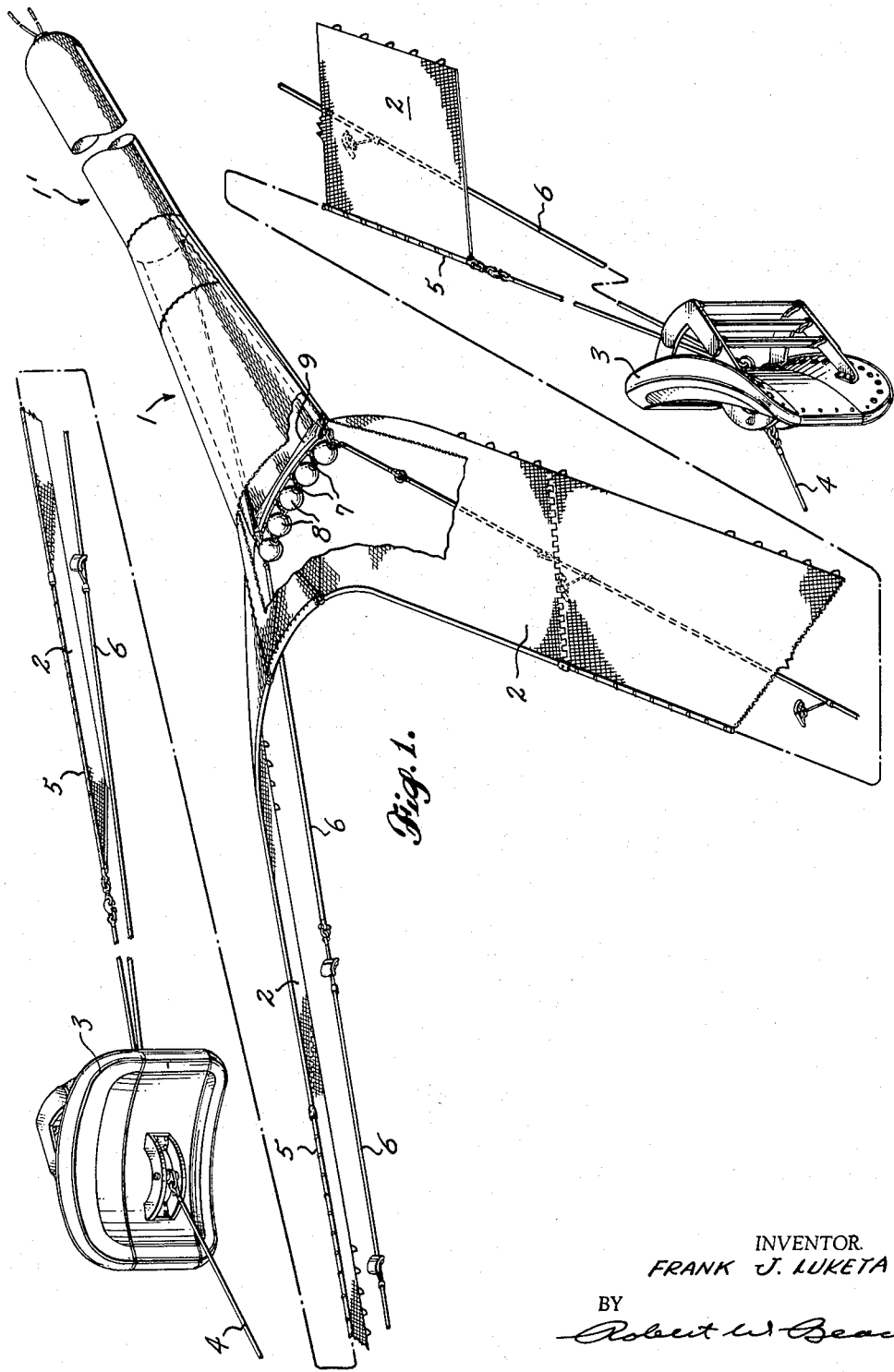
INVENTOR.
FRANK J. LUKETA
BY
ATTORNEY

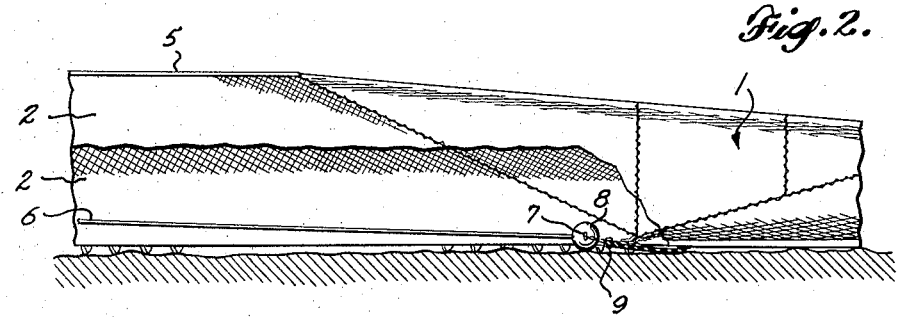
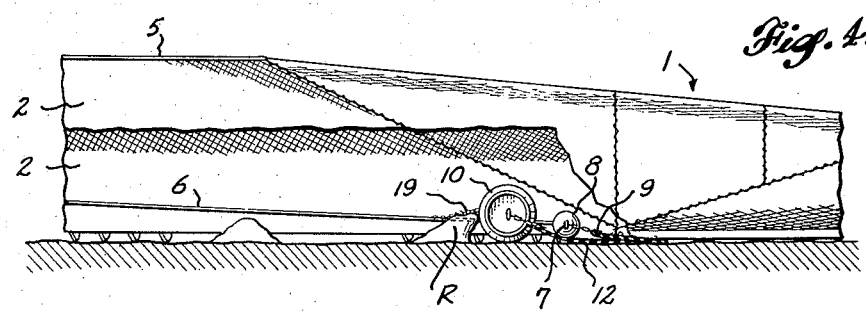
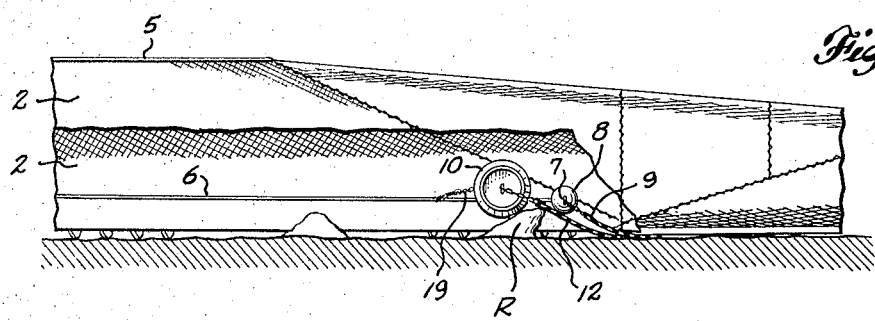
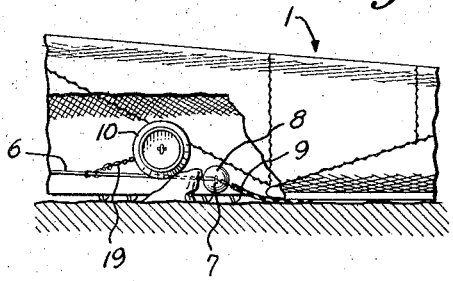
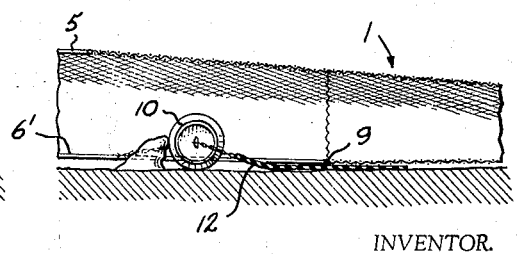

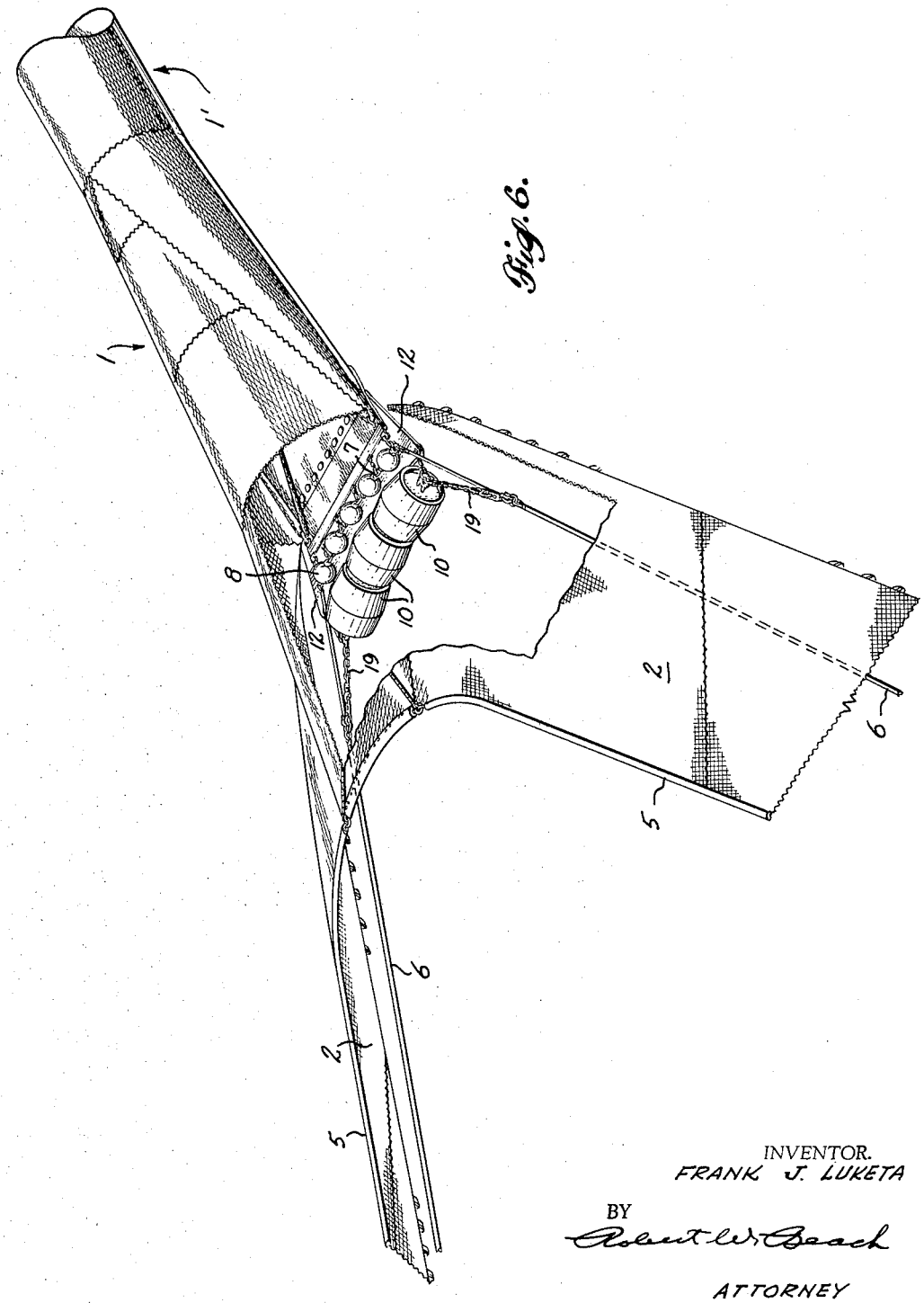

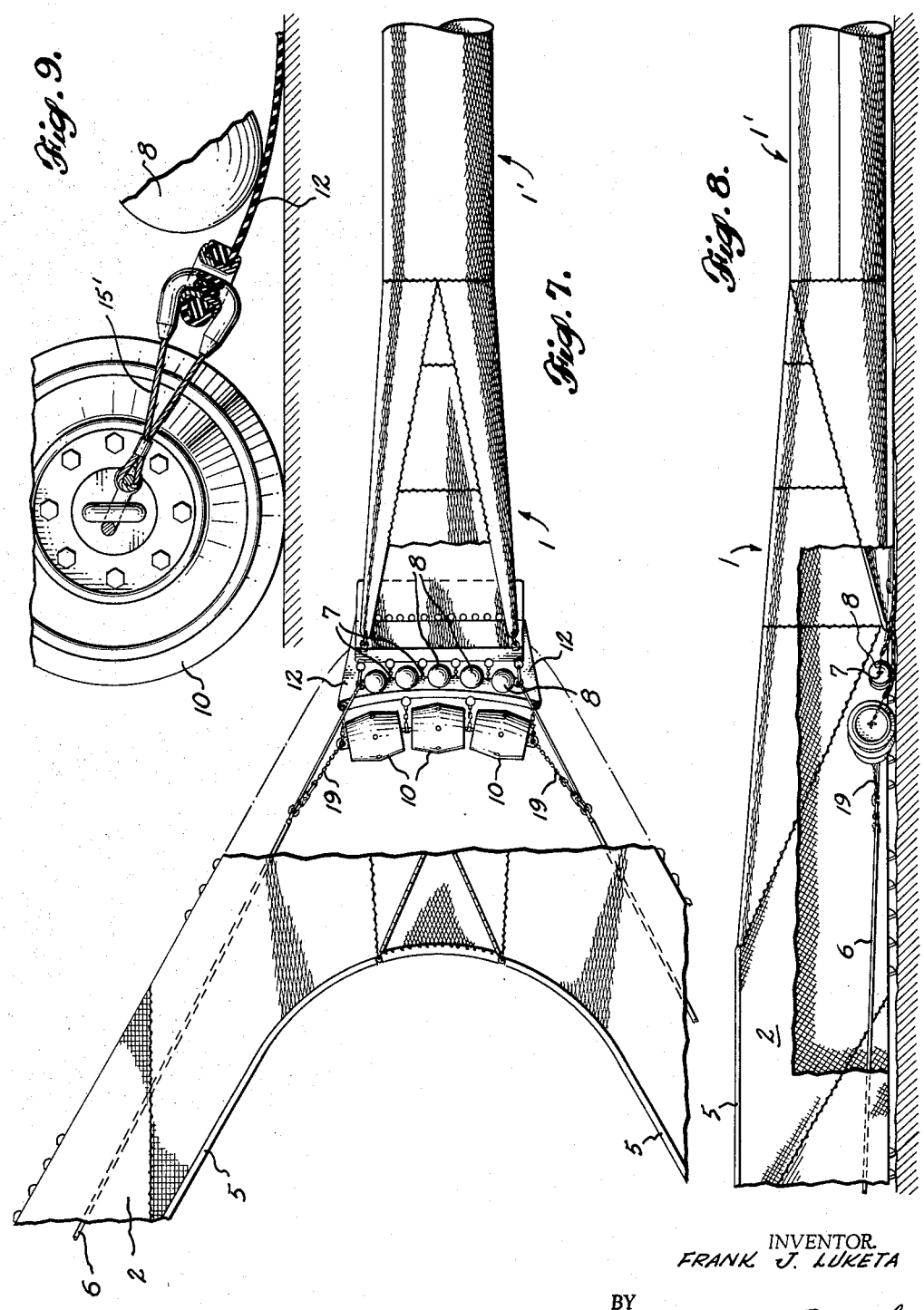

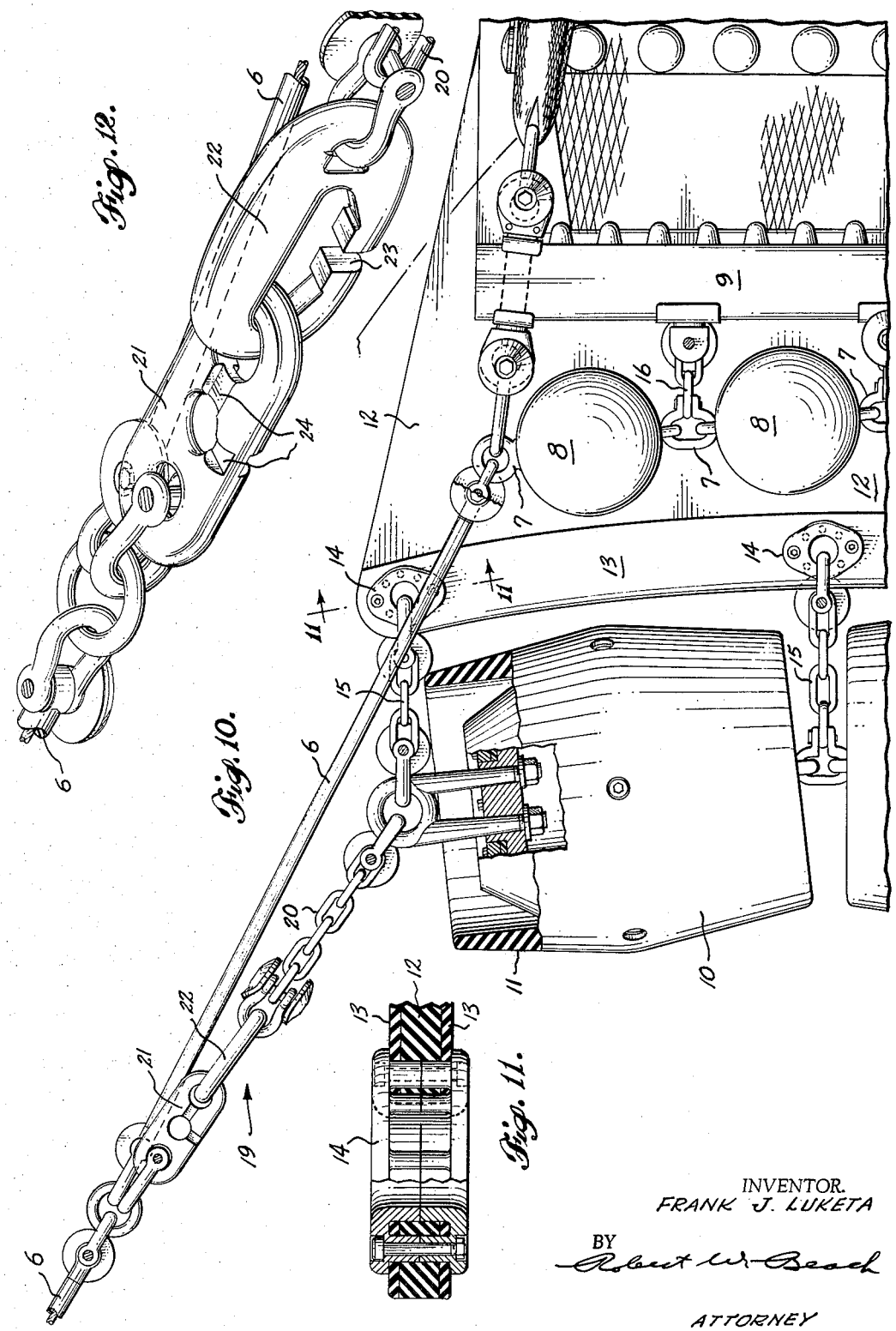

May 10, 1966 F. J. LUKETA 3,250,035
TRAWL BOBBIN AND CHAFING APRON ASSEMBLY
Filed Oct. 29, 1963 7 Sheets-Sheet 6
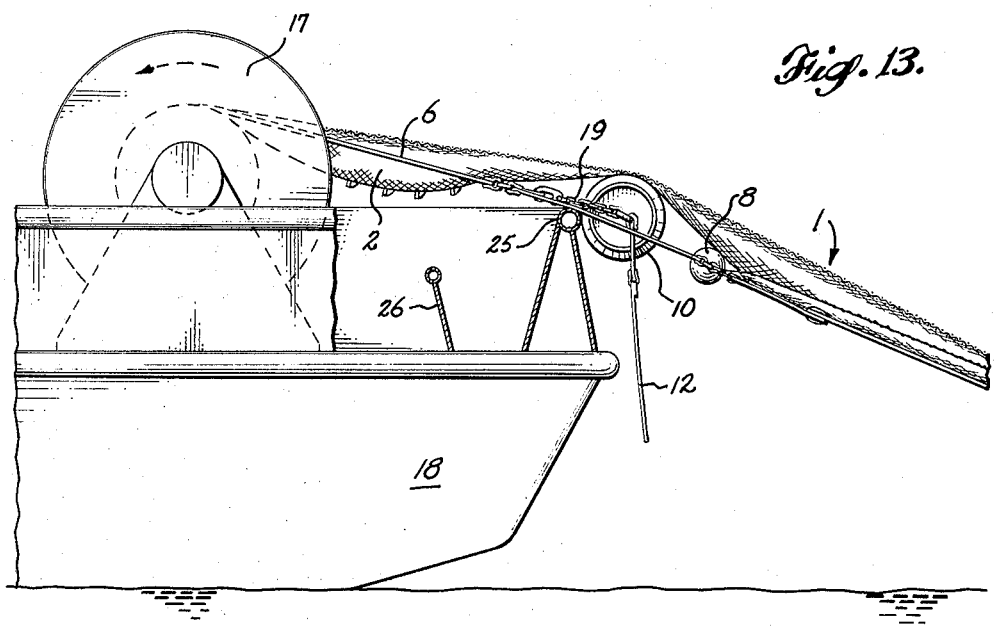
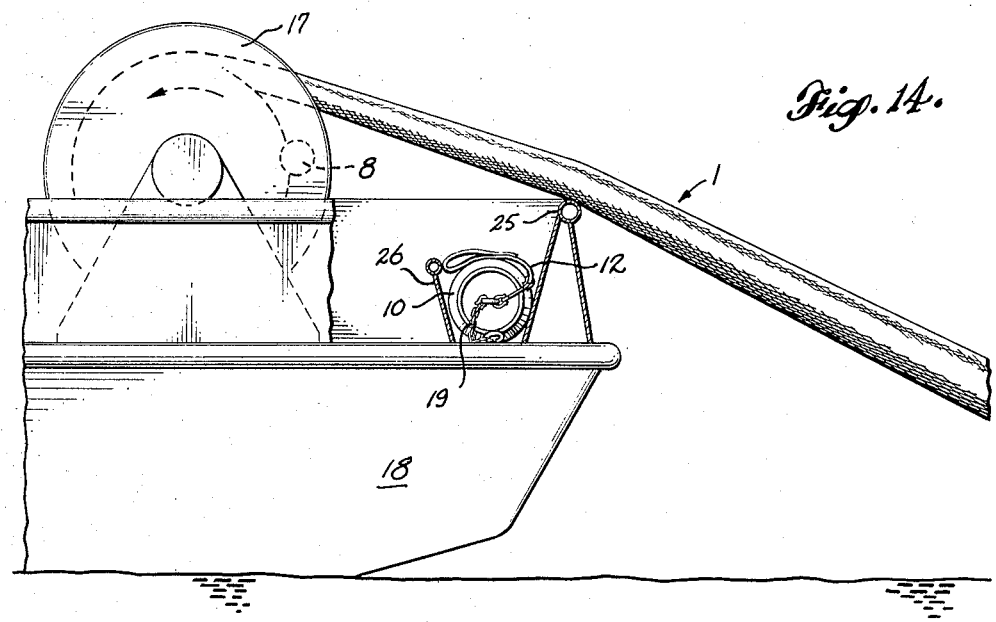
INVENTOR.
FRANK J. LUKETA
BY
ATTORNEY

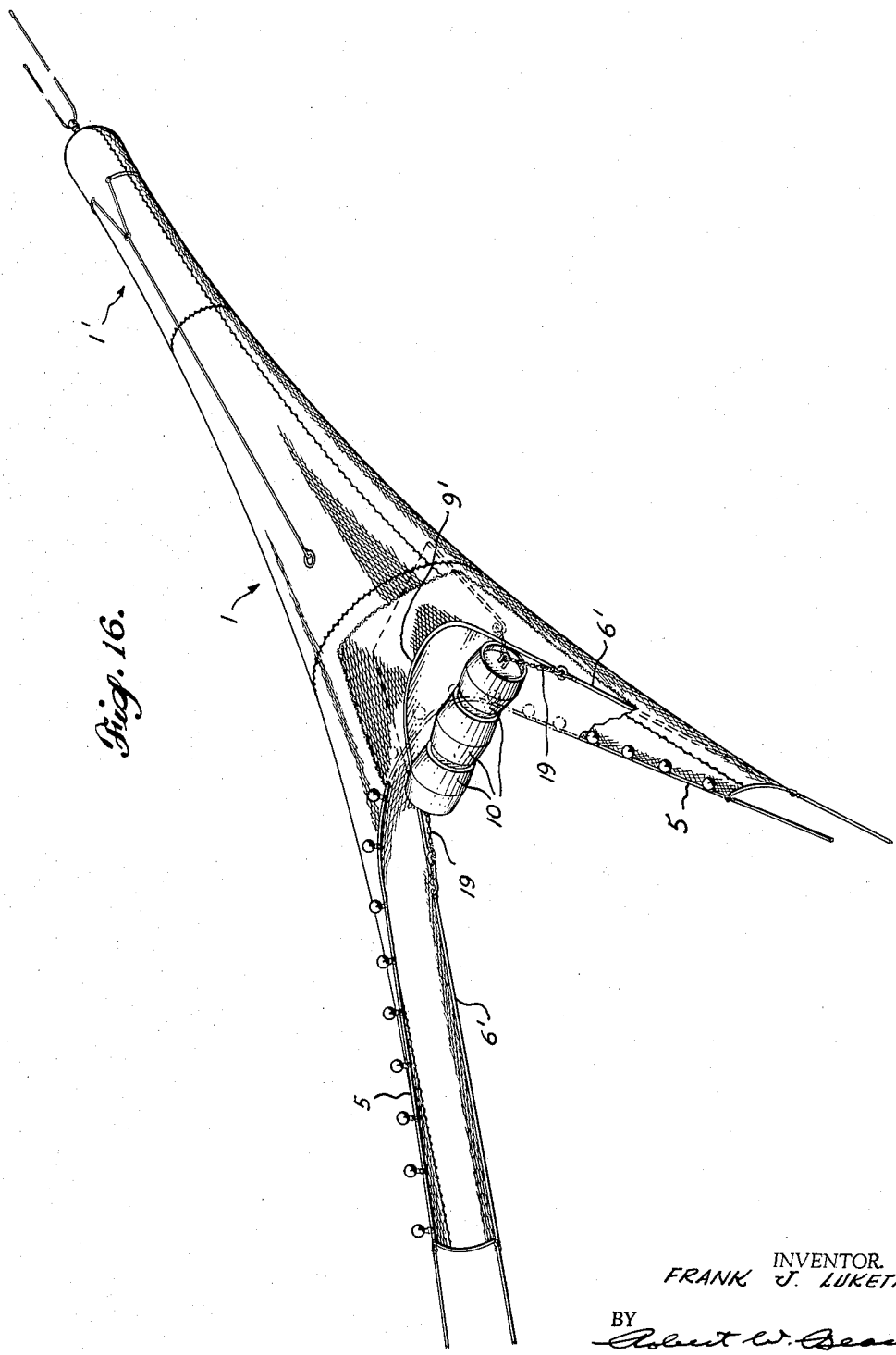

United States Patent Office 3,250,035
Patented May 10, 1966

3,250,035
TRAWL BOBBIN AND CHAFING APRON
ASSEMBLY
Frank J. Luketa, 5567 Greenwood Ave. N.,
Seattle, Wash.
Filed Oct. 29, 1963, Ser. No. 319,781
4 Claims. (Cl. 43—9)

This invention relates to a bobbin and chafing apron assembly for trawls of the bottom trawl type. The trawl itself may be conventional or of the type shown, for example, in Luketa Patent 3,058,248.

It is desirable for bottom trawls used for catching shrimp and bottom fish of various types to be drawn along the bottom of a body of water, but in such movement it is also desirable for the friction with the bottom and, consequently, the wear on the trawl gear to be minimized. Especially it is desirable to prevent the trawl from becoming snagged.

In general trawls include a funnel and cod end of net material into which fish, shrimp and other seafood are guided by wings or curtains of netting which extend forward divergently from the body of the trawl. The junction of the curtains with the trawl body forms a crotch. If the lower edge of a trawl engages an obstruction upstanding from the bottom of the body of water, such as a large rock, the crotch of the trawl will engage the rock and either permit the rock or rocks, if they are loose, to be deposited in the cod end, greatly increasing the resistance to movement of the trawl, or the trawl will simply be snagged on the rock if it is very large and strongly embedded so that the trawl cannot progress farther until it is freed from the rock.

It is the principal object of the present invention to provide a construction which will prevent a bottom trawl from fouling on bottom obstructions in most instances and which will facilitate freeing of a trawl if it should become fouled.

It is also an object to reduce the wear and tear on bottom trawls and to provide structure to receive most of the wear that cannot be avoided in effective bottom trawling, which can be replaced readily and comparatively economically.

A further object is to provide mechanism for facilitating the movement of a trawl along the bottom of a body of water which can be disconnected from the trawl quickly and easily as it is being hauled into a trawler so the trawl may be hauled in on a powered winch or reel, the method generally known as drum trawling.

The foregoing objects can be accomplished by providing for a trawl a row of bobbins which can be attached to and detached from the trawl easily and which, when attached to the trawl, are lodged immediately forward of the trawl crotch. To such row of bobbins is attached the leading edge of a chafing apron which trails rearwardly under the lower trawl bosom and which is preferably secured only by its leading edge. Such apron is made of rather flexible sheeting which at the same time is quite thick and heavy so that it cannot be substantially deflected locally easily and which is highly resistant to abrasive wear. Such apron is made of rubbery material such as rubber, synthetic rubber or plastic which can be reinforced with stranded material such as cord, wire cable or mesh or fabric reinforcement. The row of bobbins and the leading edge of the apron are flexibly connected to form a unit, such as by short chains, and the opposite ends of the row of bobbins can be connected to the respectively adjacent sweeplines by chains including quickly disengageable links. When it is desired to use the drum trawling method of trawl haulage, it is necessary that these bobbins be detachable as their considerable bulk precludes winding them onto a drum.

FIGURE 1 is a top perspective of a trawl which is not equipped with the assembly of the present invention, parts being broken away, and FIGURE 2 is a side elevation of such a trawl, with parts broken away.

FIGURE 3 is a fragmentary side elevation of a portion of a trawl, with parts broken away, equipped with bobbins according to the present invention, and FIGURES 4 and 5 are similar views of a trawl equipped with the bobbin and chafing apron assembly of the present invention illustrated under different operating conditions.

FIGURE 6 is a top perspective of a portion of a trawl to which the assembly of the present invention is applied, parts being broken away; FIGURE 7 is a plan of such apparatus, with parts broken away, and FIGURE 8 is a side elevation thereof, with parts broken away.

FIGURE 9 is an enlarged detail elevation of a portion of the assembly of the present invention, parts being shown in section.

FIGURE 10 is an enlarged detail plan of a portion of the assembly of the present invention, having parts broken away, and FIGURE 11 is a section of a detail of such assembly on line 11—11 of FIGURE 10. FIGURE 12 is an enlarged detail top perspective of a portion of the structure shown in FIGURE 10.

FIGURE 13 is a side elevation of a portion of a trawl equipped with the assembly of the present invention at one stage of the hauling operation, and FIGURE 14 is a similar view of a portion of the trawl at a different stage of the hauling operation.

FIGURE 15 is a side elevation of a portion of a trawl of common construction equipped with the assembly of the present invention, parts being broken away, and FIGURE 16 is a top perspective of such common trawl and the assembly of the present invention, with parts broken away.

A representative type of trawl is shown in FIGURE 1 including a funnel 1 into which marine life is swept by curtains 2 extending divergently forward from the funnel 1. The leading ends of such curtains are held in spread relationship by hydrodynamic doors 3 which are towed by the towing lines 4 attached to a trawler. The curtains are supported by a float line 5 and the trawl body 1 including the funnel and the cod end can be pulled directly from the doors 3 by sweeplines 6. Each of such sweeplines includes a section 7 on which ball bobbins 8 are strung. The lower bosom 9 of the trawl body is attached at intervals to the sweepline section 7 extending transversely of the direction of movement of the trawl. Such bobbins are rotatable so that they can roll along the ground and are coupled to the trawl sufficiently closely so as to elevate the bottom trawl bosom slightly from the bottom of the body of water to reduce wear. A ball bobbin installation of representative type for the purpose of the present invention is shown in my copending patent application Serial No. 252,193, filed January 17, 1963, now Patent No. 3,205,605, for Reinforcement for Panel Portions of a Trawl Net and also Patent No. 3,190,024.

Where a bottom area being trawled has larger obstructions than usual, the small ball bobbins 8 may not prevent the crotch or bosom of the trawl from becoming fouled. To enable a trawl crotch to ride over larger bottom obstructions, the use of large barrel-shaped bobbins has been proposed, placed ahead of the lower bosom of the trawl. An installation employing a single such bobbin is disclosed in Luketa Patent 3,058,248. Such barrel bobbins preferably have a diameter of at least two feet and have circumferential walls of rubber, the opposite ends of which overhang, as shown on the barrel bobbin 10 as flange 11 in FIGURE 10. The preferred construction of such a barrel bobbin is shown in detail in FIGURES 8, 11 and 12 of my copending application Serial No. 178,901 for Bobbin for Trawl Nets, filed March 12, 1962, now Patent No. 3,121,968.

FIGURE 2 shows that ball bobbins 8 having a diameter of nine to ten inches will hold the trawl bosom 9 elevated sufficiently above the sea bottom if it is reasonably smooth. Such bobbins can be made of resilient material, such as rubber, to cushion the movement over the bottom and to resist wear. If a relatively large rock obstruction were encountered, however, the crotch of the trawl could become snagged if it were supported only by the relatively small ball bobbins 8. In FIGURE 3, therefore, it is proposed to provide a combination of a row of small bobbins 8 which support directly the bosom 9 of the trawl preceded by a row of relatively large barrel bobbins 10. These bobbins should be located sufficiently close together to prevent a rock from lodging between the bobbin rows, as in FIGURE 3, but the bobbin rows are preferably sufficiently far apart as to enable both the ball bobbins and the barrel bobbins to engage the ground normally. FIGURES 6 and 7 illustrate a row including three barrel bobbins which are closely spaced endwise.

The difficulty with such an arrangement, as illustrated in FIGURE 3, is that, even though the large bobbins 10 might roll over an upstanding rock, such a rock could lodge between the row of large bobbins and the row of small bobbins, as shown in FIGURE 3, and still snag the trawl crotch. To prevent such an occurrence the constrution of the present invention includes a chafing apron 12, shown best in relation to the trawl in FIGURES 4, 5 and 6 and illustrated in greater detail in FIGURES 9 and 10. The leading edge of such apron is coupled closely to the row of large bobbins 10 and trails rearwardly beneath the small ball bobbins 8 and the trawl bosom 9 to a location rearwardly of such bosom. The fore and aft extent of the apron 12 is not critical, but it is preferred that such apron extend sufficiently far aft so that it will be subjected to the principal abrasion caused by the trawl being dragged over the ground. As shown in FIGURE 7, the apron should be sufficiently wide to extend transversely across the full width of the trawl bosom.

The beneficial effect of providing the chafing apron 12 for the purpose of deterring fouling of the trawl is illustrated in FIGURES 4 and 5. In FIGURE 4 it is assumed that one of the barrel bobbins 10 has been drawn against a rock R of a height slightly less than the radius of the bobbin. The bobbin 10 then rolls over the rock and, instead of the rock jutting upward between the row of barrel bobbins 10 and the row of ball bobbins 8, such rock will engage the apron 12 close-coupled to the row of bobbins 10, as shown in FIGURE 5. While the apron 12 is pliable, it will be sufficiently heavy and stiff so that, being tensioned by the pulling force from the row of bobbins 10 and the frictional force occasioned by the apron being dragged over the ground, it will prevent the weight of the trawl gear pressing the apron down sufficiently so that the rock will catch on it.

As shown in FIGURE 5, the chafing apron 12 serves the dual function of bridging the gap between the row of barrel bobbins 10 and the row of ball bobbins 8 and further is subjected to the abrasion and concentrated stress to which the gear is subjected by the rock. The apron thus distributes such stress to the rest of the gear and is of a construction sufficiently tough and smooth so that it will not be harmed appreciably by such a rock. Because of the stresses to which such apron is subjected, however, it will be evident that it must be attached securely to the trawl structure. In FIGURE 10 the leading edge of the apron is shown as being reinforced by a binding strip 13 and grommets 14 are provided at intervals spaced along such leading edge approximately equal to the length of the respective barrel bobbins. Such grommets and leading edge binding are shown in FIGURE 11 in detail.

The barrel bobbins 10 are conected in a string and the grommets 14 in the leading edge of the chafing apron are secured to such bobbin string by connecting members extending between the bobbins. Such connecting members are shown in FIGURE 10 as short lengths of chain and shackles 15. In FIGURE 9 a connecting member 15' is shown in the form of a cable loop. Whatever type of connecting member is used for this purpose, it should connect the chafing apron to the string of barrel bobbins flexibly to enable the leading edge of the apron to rise and fall relative to the axis of the bobbin string while at the same time retaining the leading edge of the apron close-coupled to the bobbin string. The string of ball bobbins 8 will then ride on the forward portion of the apron, as shown in detail in FIGURES 9 and 10 and on a smaller scale in FIGURES 4, 5, 6, 7 and 8.

The connection of the ball bobbins 8 to the sweeplines 6 and to the bosom 9 of the trawl is shown in detail in FIGURE 10. Such bobbins are connected in a string between the sweeplines and connecting members 16 connect the string of ball bobbins to the trawl bosom generally in the same manner that the connecting members 15 connect together the string of barrel bobbins and the leading edge of the chafing apron 12. Since the ball bobbins 8 are of smaller diameter than the barrel bobbins 10, however, the connecting members 16 preferably are considerably shorter than the connecting members 15, as will be seen in FIGURE 10. While it is possible to disconnect the string of ball bobbins 8 from the sweeplines and from the bosom of the trawl, such bobbin string for practical purposes during use of the trawl may be considered to be an integral part of the trawl gear and will be wound on the winch drum 17 on the trawler 18 as the trawl is wound in during the trawling operation, as shown in FIGURE 14.

As has been mentioned previously, the diameter of the barrel bobbins 10 is more than twice as great as the diameter of the ball bobbins 8. Also, as shown in FIGURE 10, the length of a barrel bobbin preferably is greater than its maximum diameter so that such barrel bobbin length will be more than twice as great as the diameter of a ball bobbin. Particularly a string of barrel bobbins composed of a plurality of such bobbins is, therefore, too bulky to be accommodated on the trawl winding drum 17 of a trawler's winch. Provision is, therefore, made for enabling the string of barrel bobbins to be disconnected from the sweeplines 6 as the trawl is being hauled in by the winch so that such bobbin string will not be wound on the winch drum 17. Also it is preferred that for operating purposes the chafing apron 12 be integral with the string of barrel bobbins. When the barrel bobbin string is disconnected from the sweeplines of the trawl, therefore, the chafing apron 12 will be disconnected simultaneously from the sweeplines while such apron remains attached to the string of barrel bobbins.

FIGURES 6 and 7 show the connecting members 19 by which the opposite ends of the string of barrel bobbins 10 are connected to the respective sweeplines 6. Each such connecting member, as shown in FIGURE 10, includes a length of chain 20 and quickly disengageable linkage composed of cooperating links 21 and 22 which are shown enlarged in FIGURE 12. This particular type of quickly disengageable linkage is disclosed in my now abandoned, copending application Serial No. 259,453, filed February 18, 1963, for Hook and Associated Coupling Means. Since the apron 12 simply underlies the string of ball bobbins 8 and the bosom of the trawl, the string of barrel bobbins 10 and the apron can be disconnected as a unit from the trawl by slipping the gap 23 of link 22 over the web portions 24 of reduced thickness of the link 21. The link 22 of each connecting member 19 will remain with the bobbin string and apron unit and the links 21 will remain secured to the respective sweeplines 6 upon such disconnection.

Rotation of the reel 17 in the direction indicated by the arrow in FIGURE 13 will reel in the trawl until the string of barrel bobbins 10 is drawn over the stern rail 25 of the trawler. As the links 21 on the sweeplines 6 are raised above the surface of the water during hauling of the trawl, the string of bobbins 10 and the chafing apron 12 will drop into a position dangling downward from the sweeplines. Continued hauling of the trawl will engage the bobbins with the stern rail of the trawler, as shown in FIGURE 13, while the apron is still dangling. During further progressive hauling of the trawl, the string of bobbins 10 will ride over the stern rail and again drop, this time ahead of the stern rail 25.

In FIGURE 14 a bin is shown as being formed between the stern rail 25 and a barrier or bulkhead 26, to receive the string of barrel bobbins. When such bobbin string has dropped into this bin, the winch can be halted briefly while the links 22 are disengaged from the links 21. Continued hauling of the trawl will then drag in the chafing apron 12 until it drapes onto the string of barrel bobbins, as shown in FIGURE 14. When the trawl is being paid out by reverse rotation of the drum 17, rotation of the drum can again be interrupted briefly while the links 22 are reconnected to the links 21 at the appropriate time. The string of bobbins can then follow the links 21 outward over the stern rail 25 and, when such links have been moved sufficiently far rearward, the string of bobbins and the apron again will fall into dangling position and their relationship to the sweeplines 6 will be reversed completely as the bobbin string and apron begin to be towed through the water by movement of the trawler 18.

In FIGURES 15 and 16 a conventional trawl construction is shown in which the bosom 9' of the trawl is of forwardly concave conformation, as shown in FIGURE 16, and the string of ball bobbins 8 is omitted. In this instance, the string of barrel bobbins 10 is attached to the ground lines 6' by connecting members 19 of the type previously described which can be disengaged quickly from the ground lines. Also the chafing apron 12 is secured to the string of bobbins 10 as an integral operating part of the bobbin and apron unit in the manner described above. As shown best in FIGURE 15, the fore and aft length of the chafing apron is sufficiently great so that its trailing portion lies well behind the lower bosom 9' of the trawl. Despite the lack of the string of ball bobbins 8, therefore, the chafing apron will protect the lower bosom of the trawl from being snagged by rocks of considerable size projecting up from the bottom of the body of water, as indicated in FIGURE 15, and the leading portion of the trawl underbody from abrasion as it is dragged over the sea bottom.

While the chafing apron 12 has been described as being integrated with the string of bobbins 10 for operational purposes, it will be understood that such chafing apron can be easily disconnected from the bobbin string, when desired, for repair or replacement. Such disconnection can be accomplished simply by uncoupling the shackles of the chain and shackle connecting members 15. The apron can thus be separated from the rest of the gear for repair or replacement. The construction of such apron is such, however, that it is much less susceptible to wear by abrasion than the body of the trawl would be. It may have any desired qualities of weight, stiffness and abrasion resistance considered to be most suitable for the particular type of trawl and the particular type of bottom conditions for which the apron is to be used.

I claim as my invention:

1. Bobbin and chafing apron structure for a trawl comprising a string of large bobbins of circular cross section, connecting means connecting said string of bobbins to the trawl positioning said string of bobbins forward of the lower trawl bosom, a string of small bobbins of circular cross section each having a radius approximately half as great as the radius of one of said large bobbins, connecting means connecting said string of small bobbins to the trawl at a location between said string of large bobbins and the lower trawl bosom, a chafing apron, and means connecting the leading edge of said chafing apron to said string of large bobbins to locate said chafing apron beneath said string of small bobbins and the lower trawl bosom.

2. The bobbin and chafing apron structure defined in claim 1, in which the large bobbins are barrel bobbins and the small bobbins are ball bobbins.

3. The bobbin and chafing apron structure defined in claim 1, and means connecting the lower trawl bosom to the string of small bobbins at a plurality of locations spaced along the lower trawl bosom.

4. A bobbin and chafing apron unit for a trawl comprising a string of large bobbins, quickly-disengageable connecting means connecting said string of bobbins to the trawl positioning said string of bobbins forward of the lower trawl bosom, a string of small bobbins of circular cross section each having a radius approximately half as great as the radius of one of said large bobbins, connecting means connecting said string of small bobbins to the trawl at a location between said string of large bobbins and the lower trawl bosom, a chafing apron, means connecting the leading edge of said chafing apron to said string of large bobbins to locate said chafing apron beneath said string of small bobbins and the lower trawl bosom and constituting the sole means connecting said chafing apron to the trawl, and means connecting the lower trawl bosom to said string of small bobbins at a plurality of locations spaced along the lower trawl bosom.

References Cited by the Examiner

UNITED STATES PATENTS

| | | | |
|---|---|---|---|
| 1,464,623 | 8/1923 | Lybeck | 43—4.5 |
| 1,601,893 | 10/1926 | Vigneron | 43—9 |
| 1,830,215 | 11/1931 | Vigneron | 43—9 |
| 1,863,989 | 6/1932 | Liisanantti | 43—8 |
| 2,579,787 | 12/1951 | Burney | 43—8 |
| 3,058,248 | 10/1962 | Luketa | 43—9 |
| 3,069,798 | 12/1962 | Puretic | 43—4.5 |
| 3,102,356 | 9/1963 | Luketa | 43—9 |

FOREIGN PATENTS

| | | |
|---|---|---|
| 462,538 | 3/1937 | Great Britain. |
| 727,652 | 12/1951 | Great Britain. |

SAMUEL KOREN, *Primary Examiner.*

F. RAY CHAPPELL, ABRAHAM G. STONE, W. H. CAMP, *Assistant Examiners.*